United States Patent [19]
Ruane

[11] Patent Number: 5,991,862
[45] Date of Patent: Nov. 23, 1999

[54] MODIFIED INDIRECT ADDRESSING FOR FILE SYSTEM

[75] Inventor: Lawrence M. Ruane, Parker, Colo.

[73] Assignee: Sun Microsystems, Inc., Palo Alto, Calif.

[21] Appl. No.: 08/777,415

[22] Filed: Dec. 30, 1996

[51] Int. Cl.[6] .................................................... G06F 12/10
[52] U.S. Cl. ..................... 711/202; 711/200; 711/203; 711/205; 711/206; 711/209; 711/220; 711/221; 707/200
[58] Field of Search ..................................... 711/200, 202, 711/203, 204, 205, 206, 207, 209, 218, 220, 221; 707/200, 1

[56] References Cited

U.S. PATENT DOCUMENTS

| | | | |
|---|---|---|---|
| 5,465,337 | 11/1995 | Kong | 395/417 |
| 5,696,925 | 12/1997 | Koh | 395/413 |
| 5,732,405 | 3/1998 | Ho et al. | 711/3 |

*Primary Examiner*—Tuan V. Thai
*Attorney, Agent, or Firm*—William J. Kubida; Homer C. Knearl; Holland & Hart LLP

[57] ABSTRACT

A logical address and a pointer entry for a file in an indirect address file system are translated into a physical address. A decision module tests a pointer flag in a present pointer entry. The pointer entry has a pointer and a pointer flag to identify whether the pointer points to a data storage area or a metadata storage area. The decision module indicates whether the pointer is a data pointer or a metadata pointer. In response to the decision module indicating the pointer is a data pointer, a set module combines the data pointer with the logical address to generate a physical address. A split module, in response to the decision module indicating the pointer is a metadata pointer, divides the logical address into a first portion as an index value and a remaining portion as an offset value. An update module then sets the logical address to the offset value. A retrieve module combines the metadata pointer with the index value to get the next pointer entry. Each metadata pointer points to a next successive level of indirect addressing in the plurality of levels of indirect addressing. Also, each data pointer points directly to the data storage area. As a result all levels of indirect addressing, which are from a level having the pointer entry with a data pointer to a last indirect addressing level, are by-passed.

13 Claims, 4 Drawing Sheets

MODIFIED INDIRECT ADDRESSING FOR FILE SYSTEM

BACKGROUND OF THE INVENTION

1. Field of the Invention

This invention relates to indirect addressing of files in a file system. More particularly, this invention relates to modifying the indirect addressing with additional controlled information.

2. Description of the Related Art

To a user or an application program, a file appears as a contiguous region of disk space addressed as bytes 0 through the size of the file minus one. In reality, such a file is stored as various physical blocks of data scattered throughout the disk. Accordingly, some address translation method is required to convert, or translate, the file offsets provided by the application to physical addresses in the data storage device.

A very common translation method uses a tree of fixed-sized indirect address blocks. Exemplary of this translation method is the Unix File System (UFS). An indirect address block is a block of metadata containing an array of block pointers. These block pointers point to other lower-level indirect address blocks. At the lowest level of metadata, the indirect address blocks point to fixed-sized blocks of data. The control block for the file which in Unix is the I-node, points to the top level indirect address block.

The translation method begins by using the most significant bits of the offset as an index to the root indirect address block. At the root indirect address block, the pointer to the second-level indirect address block is retrieved. Then, the next significant bits of the offset are used as the index in the second level indirect address block to fetch a pointer to the third-level indirect address block. Again, the next significant bits of the offset are used to find the pointer in third level indirect address block. That pointer may point to yet another indirect address block, or may point to the data block. It is the least-significant set of offset bits that are used as the byte index with the pointer from the last indirect address block to find the data in the data block.

The tree of indirect address blocks culminating in a data block, has a fixed depth. For example, to support a 32-bit (4 gigabyte) file system with four kilobyte indirect address blocks and four kilobyte data blocks (a traditional UNIX File System), requires two levels of indirect address blocks. Each level uses ten bits (1024 four byte block pointers), and the data block uses twelve bits. For a file system with 63-bit files using eight kilobyte indirect address blocks with an eight kilobyte data block, there would be five levels of indirect addressing, each level would have ten bits and the data block has thirteen bits.

The problems with this indirect addressing approach are that it uses a very large amount of disk space and memory for metadata, and it takes a significant amount of time to process the metadata in order to get the file. For example, associated with every data block (usually eight kilobytes in Unix) is a eight-byte entry in the lowest level indirect address block. A one terabyte file requires slightly more than one gigabyte of indirect address block storage. This is a very large amount of metadata to manage. It turns out that much of this metadata indirect addressing is wasted space because many of the files stored in the large file systems are contiguous files.

The indirect addressing file system assumes that file data blocks are scattered throughout a file system or throughout at least a large number of small contiguous regions. However, many application programs for efficiency and speed of operation will make an effort to store required files in contiguous space in the file system. As a result, it often happens that a block of indirect addresses may have a sequential arrangement of pointers. A sequential arrangement of pointers meaning that each of the pointers in the indirect address block points to the next adjacent data block. One solution in such a situation is to make the data blocks larger in size. However, if the data blocks grow larger in size, and the files become small, then a large amount of storage space is wasted because the data blocks are not filled by the file. Even if the file is large, if the file size is randomly distributed, then on average, half of the last block is left unused.

One attempt, to solve the problem of trading off large blocks of metadata versus wasted data block space in a file system, makes use of "extents." In an "extents" file system, each file is defined by a list of physical addresses with a length for each block at each physical address. For example, a file with noncontiguous blocks might be defined by the following list of physical address length pairs: First entry, 1000,50; the second entry 4000,800; third and last entry 3500,20. In the "extents" file system, this file first has 50 blocks of data beginning at physical address 1000; i.e., physical blocks 1000 through 1049. The file continues with 800 blocks of data starting at physical address 4000; i.e., 4000–4799. Finally, the file is completed with 20 blocks beginning at physical address 3500, i.e., blocks 3500–3519.

A number of problems exist with the "extents" type of file system. For example if the file requires large blocks of contiguous space, and the only spaces available are many small blocks in a noncontiguous locations, then the "extents" file system will have a very long list of "physical address, length" pairs to specify a file. A second problem with the "extents" file type system is that to retrieve data blocks within a file, specified by an offset, the software must search through the "extents" list to find the location of the block containing the data blocks sought after. Again, if the list is long, then the search process to find the correct "physical address, length" pair can be a time consuming process. Finally, in an "extents" file system if file storage is being rearranged to improve contiguousness, the "extents" list must be completely collapsed and a new "extents" list built. This requires a large amount of copying.

What is needed is an indirect address arrangement with modifications to reduce search time through the indirect address and the size of the indirect address metadata.

SUMMARY OF THE INVENTION

In accordance with this invention, the above problem has been solved by translating a file's logical address into a physical address in an indirect addressing file system where the pointer entries have a pointer and a pointer data indicator. The translation process uses computer implemented steps and begins by retrieving a pointer entry. The pointer data indicator in the pointer entry indicates a first state when the pointer points to a physical address in the data storage area and indicates a second state when the pointer points to a lower level indirect address block. After detecting whether the pointer data indicator is in the first state or the second state, the process takes two possible operative paths. If the pointer data indicator is in the first state, the pointer is combined with the logical address to set the physical address. If the pointer data indicator is in the second state, the logical address is split into an index and an offset. The logical address is updated to the offset. Further when the pointer data indicator is in the second state, the next pointer entry is retrieved from an indirect address block pointed to by the present pointer and from a location in the pointed-to indirect address block identified by the index. The translation process repeats these steps until the physical address is set by combining the physical address and logical address.

The above computer implemented steps in another implementation of the invention are provided as an article of manufacture, i.e. a computer storage medium or a computer transmission medium containing a computer program of instructions enabling a computer to perform a computer process having the above described steps.

In an machine implementation of the invention apparatus for translating a logical address and a pointer entry for a file in an indirect address file system into a physical address has a decision module, a set module, a split module, an update module and a retrieve module. The decision module tests a pointer flag in a present pointer entry. The pointer entry has a pointer and a pointer flag to identify whether the pointer points to a data storage area or a metadata storage area. The decision module indicates the pointer is a data pointer or a metadata pointer. The set module, in response to the decision module indicating the pointer is a data pointer, combines the data pointer with the logical address to generate a physical address.

The split module, in response to the decision module indicating the pointer is a metadata pointer, divides the logical address into a first portion as an index value and a remaining portion as an offset value. The update module then sets the logical address to the offset value. The retrieve module combines the metadata pointer with the index value to get the next pointer entry. The retrieve module sends the next pointer entry to the decision module for testing whether the pointer flag in the next pointer entry indicates the pointer is a data pointer or a metadata pointer. All of the modules continue to handle pointer entries in this manner until the set module generates a physical address.

As a feature of the invention a first pointer entry is provided by a file control block, or inode in the UNIX file system, for the file.

As another feature of the invention, each metadata pointer points to a next successive level of indirect addressing in the plurality of levels of indirect addressing. Also, each data pointer points directly to the data storage area. As a result all levels of indirect addressing, which are from a level having the pointer entry with a data pointer to a last indirect addressing level, are by-passed.

The great advantage and utility of the present invention is that when a pointer flag or pointer data indicator is set, the indirect addressing process will circumvent all of the unnecessary levels of indirect addressing and go directly to the data storage area. Further, if a pointer flag is not set, then the indirect addressing will work just as it has in an indirect addressing file system.

The foregoing and other features, utilities and advantages of the invention will be apparent from the following more particular description of a preferred embodiment of the invention as illustrated in the accompany drawings.

DETAILED DESCRIPTION OF THE PREFERRED EMBODIMENTS

Figure 1:
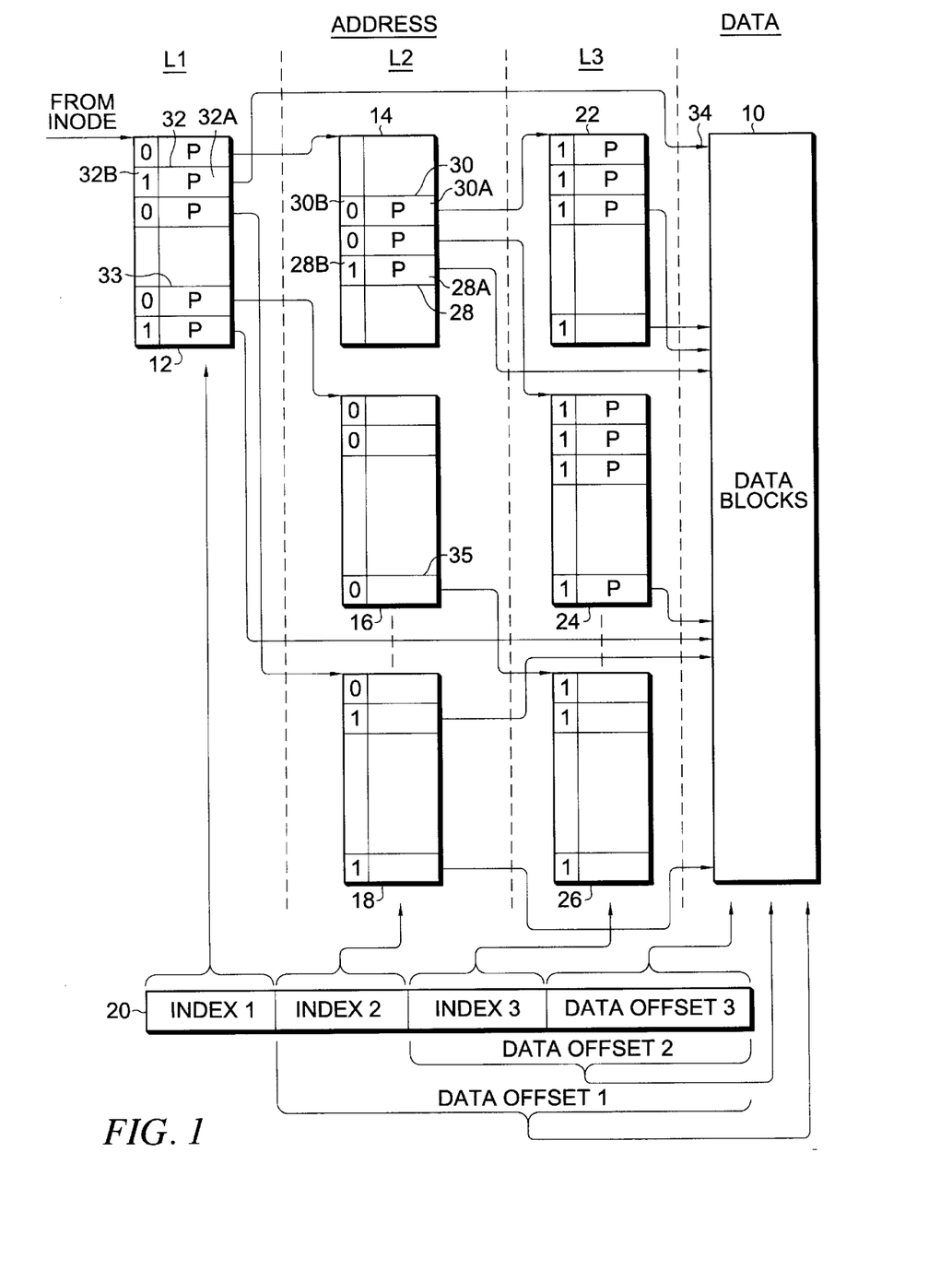
FIG. 1 is an address data flow diagram illustrating the structure of modified indirect addressing in accordance with a preferred embodiment of the invention.

FIG. 1 illustrates the structure of the modified indirect addressing as used in an embodiment of the invention. The example in FIG. 1 has three levels of indirect addressing. As will be apparent in describing the invention, the number of levels of indirect addressing is not important to the invention. The number of levels depends on the size of the file, the size of the indirect address blocks, the size of the data blocks and the size of the pointers in the indirect address blocks. Illustrated in FIG. 1 is a three-level system, accommodating a single file.

In the structure of FIG. 1, the data blocks are stored in area 10 of a storage device. The storage device could be memory, but more typically would be disk file space. A data block in area 10 is addressed through the indirect address blocks illustrated at levels 1, 2 and 3 (L1, L2 and L3). As shown in FIG. 1, level 1 is a single root indirect address block 12. The size of the indirect address block 12 depends upon the number of root addresses provided in the file system and is limited by the number of bits used in the root index portion of the offset used to address files in the file system.

Illustrated at level 2 (L2) there are three indirect address blocks 14, 16 and 18. Potentially, there could be an address block in level 2 for each of the pointer entries in the root address block 12 in level 1 (L1). The size of the indirect address blocks 14, 16 and 18 at L2 depends upon the number of bits used in the level 2 index portion of the offset used to address files in the file system. In the example of FIG. 1, the offset 20 is divided into four sections. Each of the first three sections, which are used to index to addresses in indirect address blocks in levels L1, L2 and L3, respectively, will have ten bits, and the fourth section has 13 bits. Accordingly, the maximum size of an indirect address block in level 2 or level 3 is 1,024 pointer entries. Also in L2 and L3, only three indirect address blocks are shown—blocks 14, 16 and 18 in L2 and blocks 22, 24 and 26 in L3. Potentially, there are 1024 an indirect address blocks in L2, one for each pointer entry in the root indirect address block 12. Also, there may be 1024 indirect address blocks in L3 for each indirect address block in L2.

In each indirect address block, there are 1024 pointer entries. As depicted in indirect address block 14, each pointer entry contains two pieces of information. It contains a pointer and a pointer data bit. A pointer data bit indicates whether the pointer points to a data block in the data file area 10, or the pointer points to an indirect address block in the next lower level. If the pointer data bit is set, the pointer points to a data block in the data file area 10. If the pointer data bit is not set, the pointer points to an indirect address block in the next lower level of address blocks. For example, in address block 14, pointer entry 28 contains a pointer 28A and a pointer data bit 28B. The pointer data bit 28B is a 1;

therefore, pointer 28A points to an entry point in the data block storage area 10.

Pointer entry 30 in indirect address block 14, is an example of an entry pointing to another indirect address block in the next lower level. Pointer entry 30 contains a pointer 30A and a pointer data bit 30B. Pointer data bit 30B is set to zero and, therefore, pointer 30A points to an indirect address block 22 in the next lower level, level 3 (L3).

Offset information in offset 20 is combined with these pointers in various ways to identify a data block in area 10 for retrieval. Index entries in offset 20 are used as an index to be combined with a pointer to identify the pointer entry in the next lower level of indirect addressing. Alternatively a portion of the offset 20 may be used as an offset to identify a data block location in area 10 relative to a start location in 10 pointed to by a pointer.

Indirect addressing begins with a pointer entry in the file "inode" for the UNIX file. The pointer in the inode pointer entry points to the start address of the root indirect address block in level 1 (L1). Index 1 from offset 20 is combined with the start address for the root indirect address block to find the pointer entry in the root indirect address block The pointer entry in the inode may likewise contain a pointer data bit. If that pointer data bit was set then the pointer in the inode points directly to a start address in data storage area 10 and the entire offset would index from that start address to the file data to be retrieved. Normally, however the inode pointer entry has a pointer pointing to the root indirect address block.

If the pointer data bit for a pointer entry in the root indirect address block 12 is a 1, then the pointer will point directly to a starting point in storage area 10. Pointer entry 32 has a pointer 32A pointing to start address 34 at the top of storage area 10. Pointer entry 32 contains a pointer data bit 32B set to 1 that indicates pointer 32 is pointing to a data storage area 10. The actual location of the data block to be retrieved from area 10 is defined by start address identified by the pointer and data offset 1 portion of the offset 20. Thus, for example, if pointer 32A pointed to physical address 11,000 and data offset 1 was 350. Then the physical address in area 10 from which data would be retrieved is 11,350. Accordingly, the data block at 11,350 would be retrieved in response to a root address pointing to pointer entry 32 with an offset of 350.

If, on the other hand, the pointer entry in the root address block in level 1 (L1) had a pointer data bit set to 0, then the pointer would point to an indirect address block in L2. For example, if the pointer in the root address block pointed to indirect address block 14 in L2, the pointer entry in address block 14 would be retrieved based on index 2 in the offset 20. In other words, the most significant bits in offset 20 would serve as an index to be combined with the pointer from the pointer entry in root address block 12 to find a pointer entry in an indirect address block in level 2.

If the pointer entry retrieved in L2 has a pointer data bit set to 1, as for example pointer entry 28 in indirect address block 14, then the remainder, data offset 2, of offset 20 is used as a data offset, or index, to be combined with the pointer in the pointer entry 28 to find the data block in storage area 10. For example, if pointer 28A points to physical address 2,000 in area 10, and data offset 2 in offset 20 is 400, then the data block at physical address 2400 would be retrieved from storage area 10.

On the other hand, if the pointer data bit in the pointer entry at level 2 (L2) is a zero, then the pointer simply points to an indirect address block in level 3 (L3). All indirect address blocks in L3 will have pointer data bits set to one. This is because level 3 is the lowest level of indirect addressing and the pointers in level 3 must point to physical addresses in data storage area 10. Accordingly, if level 3 of indirect addressing is used, then the index 3 portion of the offset 20 is combined with a pointer from L2 to find the pointer entry in an indirect address block in L3. Also, the data offset 3 portion of the offset 20 is then combined with the pointer from the pointer entry in L3 to find the physical address in storage area 10.

This structure when all three levels are used provides no advantage over conventional indirect addressing. However, this structure, when contiguous data blocks exist, provides a structure for addressing a larger data block of contiguous space directly from a higher indirect address level. First, a pointer data bit indicates that a pointer in a higher level pointer entry points directly to a physical address in the storage area 10. Second this higher level pointer to a physical address is combined with all, or a portion of, the offset depending on the level the pointer entry, to data retrieve from a physical address in the storage area 10. In this way, unnecessary lower level indirect addressing may be circumvented.

The operating environment, in which the present invention is used, encompasses a stand-alone computing system as well as the general distributed computing system. In the distributed computing system, general purpose computers, work-stations, or personal computers are connected in a client-server arrangement via communication links of various types, wherein programs and data, many in the form of objects, are made available by various members of the system.

Figure 2:
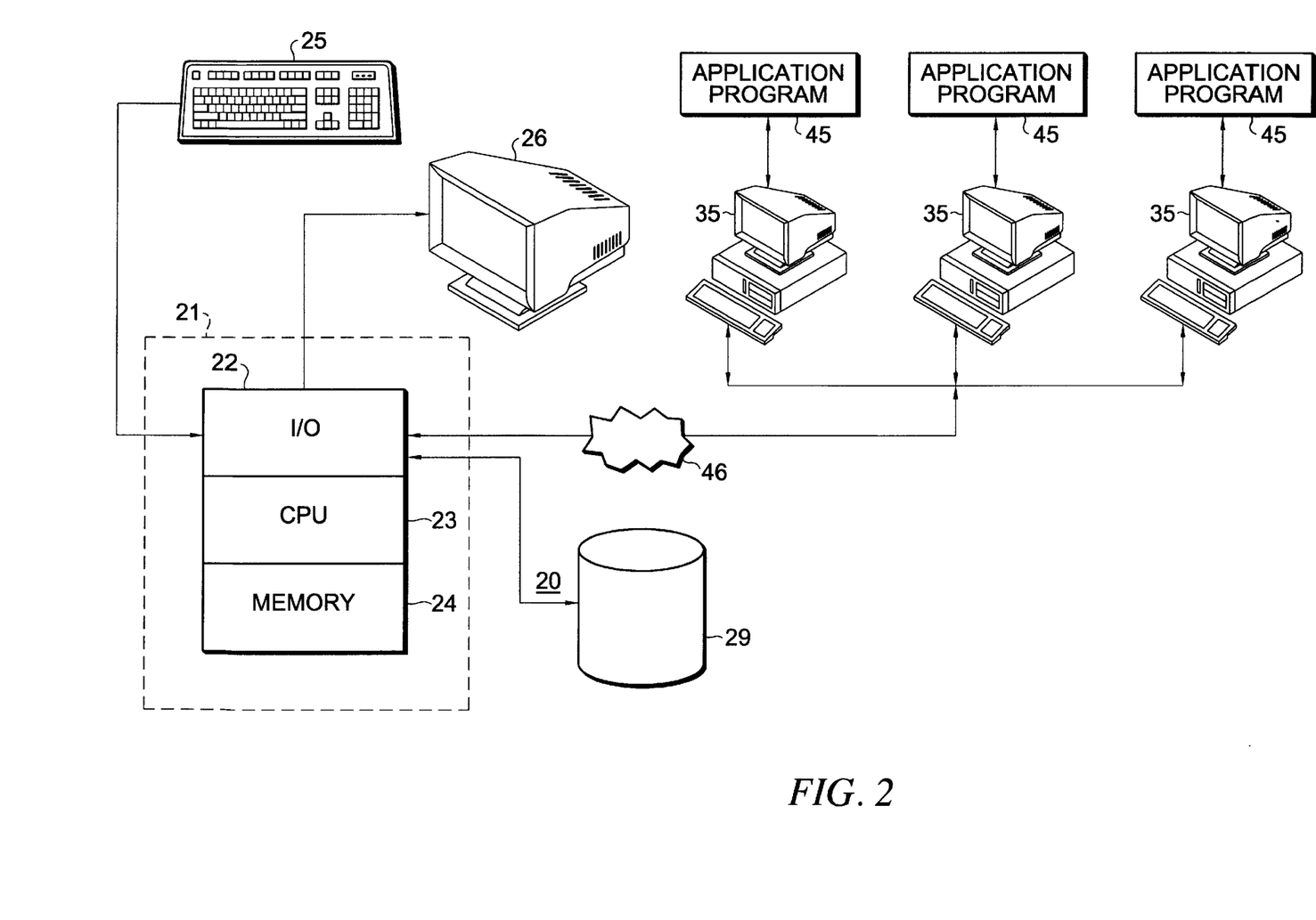
FIG. 2 illustrates a distributed processing computer system with a server and multiple clients connected in a communications network so that the server and clients may perform the logical operations of the invention when addressing data.

Some of the elements of a stand-alone computer or a general purpose work-station computer are shown in FIG. 2. In accordance with the invention, users at remote work-stations in a network, such as client processors 35, communicate through the network to a computer server 20. Server 20 includes processor 21 having an input/output section 22, a central processing unit 23, and a memory section 24. The input/output section 22 is optionally connected to a keyboard 25, a display or monitor 26, and a disk storage unit 29. The input/output unit 22 includes a communications adapter (not shown) for communicating on the network 46 to the remote client stations 35.

Application programs 45 operate on client station 35 which may access or modify files maintained by server 20. The computer program products to effectuate the apparatus and methods of the present invention may reside in the memory section 24, or on the disk storage unit 29 or similar storage media (not shown), or reside on storage mediums used by clients 35. Examples of computing systems that may be used as either a server 20 or a client 35 include the SPARC[1] systems offered by Sun Microsystems, Incorporated, personal computers offered by IBM Corporation and by other manufacturers of IBM compatible personal computers and systems running the UNIX[2], OS/2[3], HP-UX, AIX[3], DOS, etc. operating systems.

[1]SPARC is a trademark of Sun Microsystems, Inc.
[2]UNIX is a trademark Licensed by X/Open Company Ltd.
[3]OS/2 and AIX are trademarks of IBM Corporation.

As shown in FIGS. 2, client 35 and server 20 communicate over network 46 which provides client 35 with access to the files maintained on disk 29 of the server. Conversely, client 35 also transfers file data over network 46 for files maintained on the server.

Figure 3:
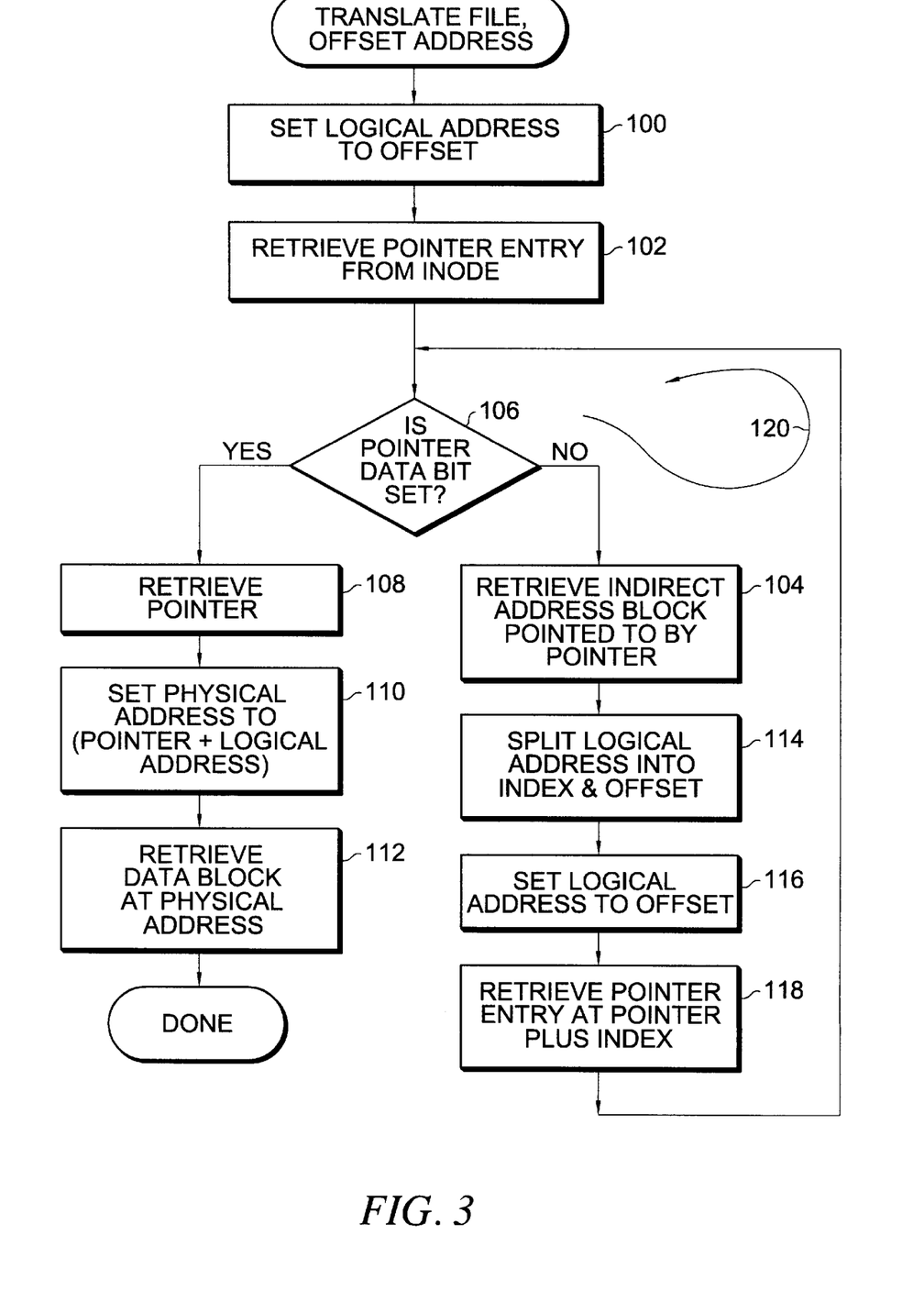
FIG. 3 shows the operation flow of logical operations to translate a file offset address to a physical address in accordance with the preferred embodiment of the invention.

FIG. 3 illustrates the logical operations in a preferred embodiment of the invention as they translate logical addresses in the modified indirect addressing structure of the invention to physical addresses and retrieve a data block at the physical address. In FIG. 3, the translate operations begin when operation 100 retrieves the offset and sets a logical address to the offset as the initial address for the file. Operation 102 then retrieves a pointer entry from the file control block (inode) for the file.

Decision operation 106 tests whether or not the pointer entry just retrieved by retrieve module 102 has a pointer data bit set. If the pointer data bit is set, the translate operation knows, the pointer points to the data storage area. The operation flow branches "Yes" from decision operation 106 to retrieve operation 108. Retrieve operation 108 retrieves the pointer from the pointer entry, and operation 110 then sets the physical address for the file to the pointer plus the logical address. In this case the logical address is the entire offset 20 (FIG. 1). The physical address set in operation 110 is then used by retrieve operation 112 to retrieve the data block at that physical address. With the data block retrieved, the translate operation is complete.

If the decision operation 106 detects that the pointer data bit is not set, i.e. the pointer in the pointer entry points to an indirect address block, then the operation flow branches "No" from decision operation 106. The operation flow then passes to retrieve module 104. In the example of FIG. 1, retrieve module 104 in FIG. 3 now retrieves the root indirect address block pointed to by the pointer in the pointer entry from the inode. Then split module 114 splits the logical address set to offset 20 (FIG. 1) by operation 100 into an index portion and an offset portion. In this case, the logical address is split into Index 1 and Data Offset 1 (FIG. 1). Operation 116 sets a new logical address to the offset divided out of the previous logical address in operation 114. As a result the logical address has now been set to Data Offset 1 in FIG. 1.

Operation 118, which may proceed before, or in parallel with, operation 116 uses the index split from the previous logical address by operation 114 to find the new pointer entry. Operation 118 retrieves the new pointer entry from the indirect address block retrieved by module 104 at the location identified by the index. In this case of FIG. 1, the pointer points to root indirect address block 12, and Index 1 identifies pointer entry 32. After the new pointer entry 32 is retrieved by operation 118, operation flow returns to decision operation 106.

As long as decision operation 106 detects that the pointer data bit in the pointer entry has not been set (i.e., pointer data bit equals 0), the operation flow will stay in loop 120. In each pass through this loop, operation 104 retrieves the indirect address block pointed to by the pointer in the pointer entry just retrieved by operation 118 during the previous pass. Split module 114 splits the logical address, which was updated in the previous pass, into an index and an offset value. In the example of FIG. 1, the second pass through loop 120 would split the offset 20 into Index 2 and Data Offset 2. Also, the logical address in the second pass would be updated to Data Offset 2 by operation 116, and the next pointer entry would be retrieved by operation 118. The next pointer entry is located at Index 2 location in the indirect address block in level 2 (L2) retrieved by operation 104. For example, if pointer entry 33 had been retrieved from the root indirect address block during the first pass, then operation 104 retrieves indirect address block 16 during the second pass and operation 118 might retrieve pointer entry 35 based on Index 2 during the second pass.

If the pointer data bit in the next pointer entry is still not set after the second pass through 120 (for example pointer entry 35), then in the third pass through loop 120, split operation 114 splits the new offset into Index 3 and Data Offset 3. In the third pass, an indirect address block in level 3 (L3) is retrieved, and a pointer entry in that indirect address is retrieved by operation 118. This pointer entry at the lowest level L3 must have a pointer data bit set to 1. Accordingly, at the end of the third pass, decision operation 106 must branch "Yes." Now operation 108 and 110 will set the physical address to the pointer from the pointer entry in level 3 plus the logical address which is now Data Offset 3.

If all of the pointer entries, as in the above described example, have pointer data bits set to "0," there is no advantage over conventional indirect addressing. The utility and great advantage of the invention is that if the pointer data bit in the pointer entry is set to "1" at any point from the inode through any of the levels higher than the lowest level, then the pointer and remaining offset can address directly a data block in storage area 10 of FIG. 1. An example where the pointer entry in the inode points to data storage area 10 has already been discussed with reference to FIG. 1.

Figure 4:
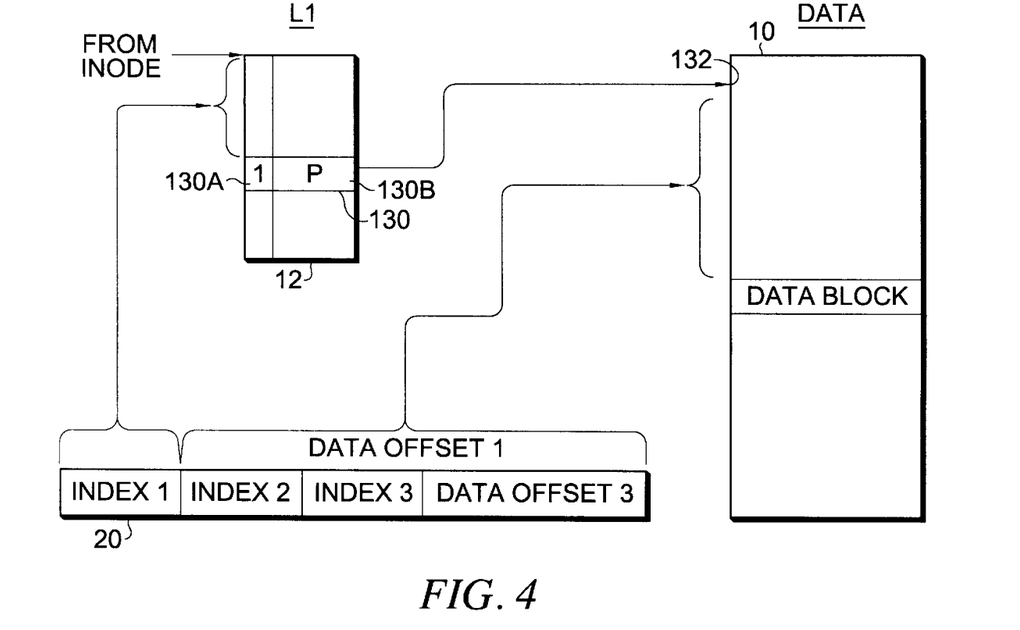
FIG. 4 shows the address data flow where the modified indirect address points to the data block from the highest level of indirect address blocks.

FIG. 4 is an example where the pointer data bit in the inode pointer entry was set to "0" (not pointing to data) and the pointer data bit 130A in the pointer entry 130 in level 1 or the root indirect address block 12 is set to "1" (pointing to data). Pointer entry 130 is located by combing Index 1 with the pointer from the inode. Pointer 130B in pointer entry points to start address 132 in the data storage area 10. The data in the file is found at physical address equal to the start address 132 plus Data Offset 1. In this example levels L2 and L3 of indirect addressing have been by-passed.

Figure 5:
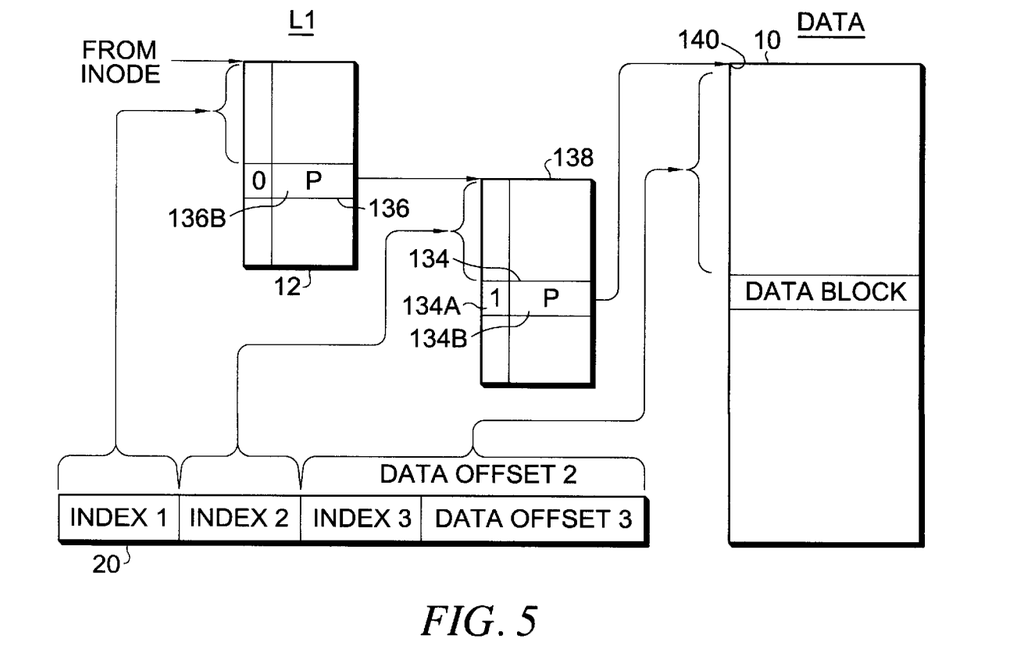
FIG. 5 shows the address data flow where the modified indirect address points to the data block from a middle level indirect address block.

FIG. 5 is an example where the pointer data bit is not set until pointer entry 134 at level 2. Now two passes through loop 120 in FIG. 3 are required. During the second pass through loop 120, Index 2 will be used with the pointer 136B from pointer entry 136 in root indirect address block 12 of level 1 to find the pointer entry 134 in level 2. Data Offset 2 is used with pointer 134 in pointer entry 134 of indirect address block 138 in level 2 to point directly to data start address in data storage area 10. The data location in the file is found at a physical address equal to start address 140 plus Data Offset 2. In this example level L3 of indirect addressing has been by-passed.

In either FIG. 4 or FIG. 5, data storage for metadata has been saved and time has been saved in reaching a data block area. If it is not possible to use the pointer data bit, then all three indirect levels of addressing are used and the preferred embodiments work just as efficiently as if there were no pointer data bit in variable offset addressing. Thus, the modified indirect addressing of the present invention permits optimization of indirect addressing without penalizing indirect addressing if optimization is not possible.

While the invention has been particularly shown and described with reference to a preferred embodiment thereof, it will be understood by those skilled in the art that various other changes in the form and details may be made therein without departing from the spirit and scope of the invention.

What is claimed is:

1. A method for translating a file's logical address into a physical address in a file system having a data storage area and indirect address blocks with pointer entries, said method comprising the steps of:

(a1) providing the pointer entries with a pointer and a pointer data indicator, said pointer data indicator adapted to indicate a first state when the pointer points to a physical address in the data storage area, and said pointer data indicator adapted to indicate a second state when the pointer points to a lower level indirect address block;

(a2) retrieving a first pointer entry;

(b) detecting whether said pointer data indicator is in the first or the second state;

(c) if said pointer data indicator is in the first state, combining the pointer with the logical address to set the physical address by:

(c1) locating a data storage are at a data start address specified said pointer; and (c2) adding the logical address to the data start address from said pointer to get the physical address for a data block in the data storage area;

(d) if said pointer data indicator is in the second state, splitting the logical address into an index and an offset and updating the logical address to the offset;

(e) if said pointer data indicator is in the second state, retrieving a next pointer entry located in a pointed-to, indirect address block pointed to by said pointer and at a location in said pointed-to, indirect address block identified by the index from step (d); wherein:

(e1) locating the pointed-to, indirect address block at a start address specified hy said pointer; and (e2) combining the index with the start address from said pointer to retrieve the next pointer entry at the location in the pointed-to, indirect address block identified by the index;

(f) repeating steps (b) through (e) until the physical address is set by step (c).

2. The method of claim 1 wherein said first pointer entry is from a file control block.

3. The method of claim 1 wherein said pointer data indicator is a pointer data bit.

4. The method of claim 1 further comprising the step of:

(g) retrieving a data block at the physical address set by step (c).

5. Apparatus for translating a logical address and a pointer entry for a file in an indirect address file system into a physical address, said file system having a plurality of levels of indirect addressing in a metadata storage area, said apparatus comprising:

a module for providing a pointer and a pointer flag in a pointer entry, the pointer flag identifying whether the pointer points to a data storage area or the metadata storage area;

a decision module for testing the pointer flag in a present pointer entry, said decision module also for indicating whether the pointer is a data pointer or a metadata pointer;

a set module responsive to said decision module which indicating the pointer is the data pointer and combining the data pointer with the logical address to generate a physical address;

a split module responsive to said decision module which indicating the pointer is the metadata pointer and dividing the logical address into a first portion as an index value and a remaining portion as an offset value;

an update module for setting the logical address to the offset value said split module; and a retrieve module for combining the metadata pointer with the index value to get the next pointer entry and sending the next pointer entry to said decision module for testing whether the pointer flag in the next pointer entry indicates the pointer is the data pointer or the metadata pointer whereby all of the modules continue to handle pointer entries until said set module generates said physical address;

the metadata pointer points to a block start address for an in address block; and said retrieve module adds the index value to the block start to locate the next pointer entry;

the data pointer points to a data start address in the data storage area; and said set module adds the logical address to the data start address to generate the physical address.

6. The apparatus of claim 5 wherein a first pointer entry is provided by a file control block for the file.

7. The apparatus of claim 5 and in addition:

a data block access module responsive to the physical address from said set module accessing the data block at the physical address.

8. The apparatus of claim 5 wherein:

each metadata pointer points to a next successive level of indirect addressing in the plurality of levels of indirect addressing; and each data pointer points to the data storage area whereby all levels of indirect addressing from a level having the pointer entry with a data pointer to a last indirect addressing level are by-passed.

9. A computer program storage medium readable by a computing system and encoding a computer program of instructions for executing a computer process for translating a file's logical address into a physical address in a file system, the file system having indirect address blocks with pointer entries, said computer process comprising the steps of:

(a1) providing the pointer entries with a pointer and a pointer data indicator, said pointer data indicator adapted to indicate a first state when the pointer points to a physical address in a data storage area, and said pointer data indicator adapted to indicate a second state when the pointer points to a lower level indirect address block;

(a2) retrieving a first pointer entry;

(b) detecting whether said pointer data indicator is in the first state or the second state;

(c) if said pointer data indicator is in the first state, combining the pointer with the logical address to set the physical address by:

(c1) locating the data storage area at a data start address specified by said pointer; and (c2) adding the logical address to the data start address from said pointer to set the physical address for a data block in the data storage area;

(d) if said pointer data indicator is in the second state, splitting the logical address into an index and an offset and updating the logical address to the offset;

(e) if said pointer data indicator is in the second state, retrieving the next pointer entry located in a pointed-to, indirect address block pointed to by said pointer and at a location in said pointed-to indirect address block identified by the index from step (d) by:

(e1) locating the pointed-to, indirect address block at a start address specified by said pointer; and (e2) combining the index with the start address from said pointer to retrieve the next pointer entry at the location in the pointed-to, indirect address block identified by the index;

(f) repeating steps (b)–(e) until the physical address is set by step (c).

10. The computer program storage medium of claim 9 where, in the computer program said first pointer entry is from a file control block.

11. A computer program transmission medium storing in transit a computer program being downloaded from a first computing system to a second computing system, said computer program transmission medium encoding a computer program of instructions for executing a computer process for translating a logical address and a pointer entry for a file in an indirect address file system into a physical address, said file system having a plurality of levels of indirect addressing in a metadata storage area, said computer process comprising the steps of:

providing the pointer entries with a pointer and a pointer data indicator, said pointer data indicator adapted to indicate a first state when the pointer points to the physical address in the data storage area, and said pointer data indicator adapted to indicate a second state when the pointer points to a lower level indirect address block;

testing a pointer flag in a present pointer entry, said testing step indicating the pointer is a data pointer or a metadata pointer;

in response to said testing step indicating the pointer is the data pointer, first combining the data pointer with the logical address to generate the physical address;

in response to said testing step indicating the pointer is the metadata pointer, splitting the logical address into a first portion as an index value and a remaining portion as an offset value;

updating the logical address to the offset value;

second combining the metadata pointer with the index value to get next pointer entry;

returning the next pointer entry to said testing step for testing whether the pointer flag in the next pointer entry indicates the pointer is the data pointer or the metadata pointer whereby all of the steps continue to process pointer entries until said first combining step generates said physical address;

wherein the metadata pointer points to a block start address for an indirect address block;

said second combining step adds the index value to the block start address to locate the next pointer entry;

the data pointer points to a data start address in the data storage area; and     said first combining step adds the logical address to the data start address to generate the physical address.

12. The computer program transmission medium of claim 11 where said computer process in the computer program further comprises the step of:

accessing a data block at the physical address.

13. The computer program transmission medium of claim 11 where, in the computer program:

each metadata pointer points to a next successive level of indirect addressing in the plurality of levels of indirect addressing; and     each data pointer points to the data storage area whereby all levels of indirect addressing from a level having the pointer entry with a data pointer to a last indirect addressing level are circumvented.

\* \* \* \* \*